(12) United States Patent
Kumar et al.

(10) Patent No.: US 10,652,341 B2
(45) Date of Patent: May 12, 2020

(54) RESTFUL INTERFACE SYSTEM FOR AN APPLICATION

(71) Applicant: Microsoft Technology Licensing, LLC, Redmond, WA (US)

(72) Inventors: Abhishek Kumar, New Delhi (IN); Anand Ramagopalrao, Hyderabad (IN); Sagar Jagdish Hotchandani, Bibvewadi (IN); Ravi Kant Pandey, Hyderabad (IN); Lavanya Kappagantu, Hyderabad (IN); Christopher Adam Brooks, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/252,947

(22) Filed: Jan. 21, 2019

(65) Prior Publication Data

US 2019/0306249 A1 Oct. 3, 2019

Related U.S. Application Data

(63) Continuation of application No. 15/256,092, filed on Sep. 2, 2016, now Pat. No. 10,187,477.

(51) Int. Cl.
*H04L 29/08* (2006.01)
*H04L 12/24* (2006.01)

(52) U.S. Cl.
CPC ............ *H04L 67/141* (2013.01); *H04L 67/02* (2013.01)

(58) Field of Classification Search
None
See application file for complete search history.

(56) References Cited

U.S. PATENT DOCUMENTS

| 2015/0227406 A1* | 8/2015 | Jan ..................... G06F 11/079 714/37 |
| 2016/0291993 A1* | 10/2016 | Prabhakar .......... G06F 9/45529 |
| 2017/0332302 A1* | 11/2017 | Ercan ............... H04W 36/0088 |

* cited by examiner

*Primary Examiner* — Natisha D Cox
(74) *Attorney, Agent, or Firm* — Ray Quinney & Nebeker, PC; Thomas M. Hardman; Marcus Lemmon

(57) ABSTRACT

An endpoint system provides a REST endpoint for an application. The endpoint system processes request messages based on message pair data for each message that includes an operation and parameter data. The parameter data includes parameter information for each parameter that identifies whether the value for the parameter is to be taken from the URI or payload of a request message. The endpoint system receives request messages that have a URI and payload. The URI includes an operation name. The endpoint system processes each request message in accordance with the message pair data for the operation specified in the request message. For each parameter of the message pair data, the endpoint system extracts the value for the parameter from either the URI or payload as specified by the parameter information for the parameter. The endpoint system then invokes the operation passing the one or more extracted values as actual parameters.

20 Claims, 4 Drawing Sheets

RESTFUL INTERFACE SYSTEM FOR AN APPLICATION

This application is a continuation of U.S. patent application Ser. No. 15/256,092 filed on Sep. 2, 2016. The aforementioned application is expressly incorporated herein by reference in its entirety.

BACKGROUND

Many applications, such as a customer relationship management ("CRM") application or enterprise resource planning ("ERP") application, provide a standard set of entity types with each entity type having attributes to model and manage business data. For example, a CRM application may have a standard set of entity types such as an account, a customer, and a campaign, and the account entity type may have attributes such as name and address. A data model specifies metadata for defines the entity types and attributes for the entity types for the business data. These applications may also allow users to modify the model, for example, by defining new entity types and new attributes. For example, a user may define an entity type such as a college that has attributes that include name and public/private flag. Each entity type is represented as a "metadata entity" in the data model for the application and has an entity name. For example, a CRM application may have a metadata entity for each of an account, a customer, and a campaign with the names of "account," "customer," and "campaign." These applications also allow user to create "entities," which are instances of entity types, to store the data of the applications as the values of the attributes of the entity type. For example, a user may create entity of the customer entity type for each customer. These applications also allow users to define actions to modify data and functions to access data. For example, a user may define an action to add an entity that is a list ("list entity") to an entity that is a campaign ("campaign entity").

These applications may also support a client/server model in which the application is hosted on a server that interfaces with client code that runs on user devices (e.g., desktops or smart phones). These applications may allow the clients to access the server using an interface that supports the Simple Object Access Protocol ("SOAP"). SOAP is a protocol specification for exchanging structure information for web services typically via the Hypertext Transfer Protocol ("HTTP"). A SOAP message consists of an envelope, a header, and a body. These applications typically use a request/response model to allow clients to access the services of the application by invoking operations. A request sent from a client to the server specifies the requested service such as create a new metadata entity corresponding to a new entity type, create a new entity of a certain entity type, or perform a user-defined operation (i.e., action or function). The request also specifies parameters for the request such as the attributes of the metadata entity to create, the entity type of the entity to create and the values of its attributes, and the parameters for an action. A response to a request is sent from the server to the requesting client and includes responsive data. For example, the responsive data for a request to create an entity may be globally unique identifier ("GUID") for the entity. After receiving the response, the client can then can send a request that includes the GUID to modify to modify an attribute of the entity. A request message and the response message are referred to as a message pair. These applications, of course, need to understand and process the message pairs.

Although a separate code could be specifically developed to handle each message pair (e.g., extracting operation name and parameter values), an application may instead store information, referred to as "message pair data," defining each message pair and use common code to process message pairs. The message pair data includes parameter information for each parameter that identifies the name of the parameter and its type (e.g., string or GUID). When a request message is received, the common code extracts the operation name from the message, retrieves the message pair data for that operation name, and then for each parameter, extracts the data for that parameter from the message and creates an actual parameter of the specified type that is initialized base on the extracted value. The common code then invokes the operation passing the actual parameters. The following is an example of the signature for a service named "AddItemCampaign," which adds an item (e.g., a list entity or product entity) to the campaign:
AddItemCampaign(GUID CampaignId, Guid EntityId, string EntityName)

The information defining the message pair for this service may be represented using eXtensible Markup Language ("XML") data as follows:

```
<SdkMessagePair>
    <Endpoint>soap</Endpoint>
    <SdkMessageRequest>
        <Name>AddItemCampaign</Name>
        <Fields>
            <Field>
                <Name>CampaignId</Name>
                <ClrParser>System.Guid</ClrParser>
            </Field>
            <Field>
                <Name>EntityId</Name>
                <ClrParser>System.Guid</ClrParser>
            </Field>
            <Field>
                <Name>EntityName</Name>
                <ClrParser>System.String</ClrParser>
            </Field>
        </Fields>
    </SdkMessageRequest>
    <SdkMessageResponse>
    ...
</SdkMessagePair>
```

The XML data includes a <field> tag for each parameter that specifies specifies the name of each parameter (e.g., "EnitityId") and its type (e.g., System.Guid). When a message is received that specifies the AddItemCampaign operation, the server retrieves this XML data, creates the actual parameters, and invokes the AddItemCampaign passing the actual parameters. Although not illustrated, the XML data includes information defining the response message so that the server can send a response message with the data defined for the AddItemCampaign operation.

As discussed above, these applications provide services that allow users to define new message pairs. For example, when a user wants to define a new operation, the user installs on the server and adds the code for the operation and a new message pair for that operation. A client can then send request messages for the new operation, and the application will use the new message pair for that operation to extract parameters and invoke the new code.

Although the usage of SOAP has been both wide-spread and successful, a newer and improved protocol, referred to as the Open Data Protocol ("OData"), is being rapidly adopted by the computing industry. OData employs a representational state transfer ("REST") model. A system that conforms with the REST model is said to be "RESTful." The REST model uses the same HTTP verbs (e.g., POST and GET) as used by web browsers. For example, an OData request to retrieve a collection of people may be represented as follows:

GET serviceroot/People

The "GET" is the HTTP verb, and "serviceroot/People" is URI. The "serviceroot" is the URI of the server, and "People" is a resource identifier that identifies a collection of people of the server. Upon receiving the request, the server retrieves all people entities and sends to the client the data of the people entities as the payload of the response message. As another example, an OData request to retrieve a single instance of people may be represented as follows:

GET serviceroot/People('russelwhyte')

The "russelwhite" represents the resource identifier of the people entity to be retrieved. Both request messages and response messages can have payloads. The payloads may be specified using JavaScript Object Notation ("JSON"). As another example, an OData message to perform an AddItemToVehicle operation on the people entity may represented GET serviceroot/People('russelwhyte')/AddItemToVehicle.

The payload for the OData message may include the identifier of the vehicle. In this example, the operation AddToItemVehicle is said to be bound to the entity identified by "russelwhyte." An OData request message may also include a query option for identifying entities that match a query.

SUMMARY

In some embodiments, an endpoint system provides a REST endpoint for an application. The endpoint system processes request messages based on message pair data for each message that includes an operation and parameter data. The parameter data includes parameter information for each parameter that identifies whether the value for the parameter is to be taken from the URI or payload of a request message. The endpoint system receives request messages that have a URI and payload. The URI includes an operation name (or message name). The endpoint system processes each request message in accordance with the message pair data for the operation specified in the request message. For each parameter of the message pair data, the endpoint system extracts the value for the parameter from either the URI or payload as specified by the parameter information for the parameter. The endpoint system then invokes the operation passing the one or more extracted values as actual parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
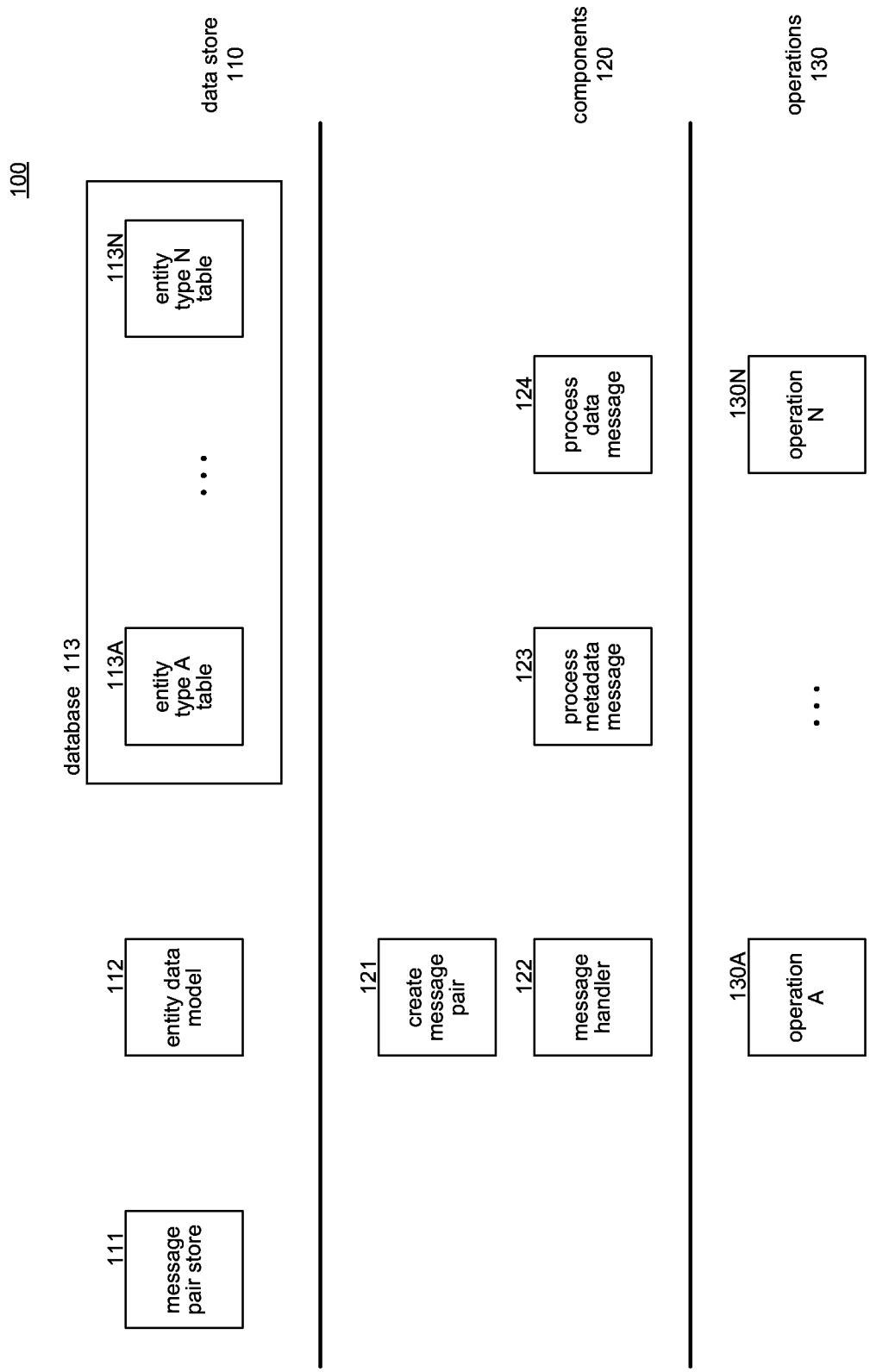
FIG. 1 is a block diagram illustrating aspects of an endpoint system in some embodiments.

A method and system for providing a REST endpoint providing a REST interface as application programming interface ("API") for an application is provided. In some embodiments, an endpoint system generates message pair data for messages supported by the endpoint system. The message pair data, like the message pair data for a SOAP endpoint, includes the name of operation and parameter data. However, unlike the messages for a SOAP endpoint, some of the values for the parameters are included in the URI of a REST message, rather than in its payload. The operation of the message is referred to a being bound to parameter specified in the URI. To indicate which parameters the operation is bound to, the endpoint system includes a parameter binding information tag (e.g., <parambindinfo>) in the field tag for the parameters to which the operation is bound. For example, an operation to add an item (e.g., a person, an animal, or product) to a vehicle may be represented as follows:

AddItemToVehicle(Guid Vehicle, Guid EntityId, String EntityName) where EntityId is identifier of the item to add and EntityName is the entity type of the item to add. To support the REST interface, the endpoint system exposes the operation as follows:

Item.AddItemToVehicle(Vehicle Vehicle).

This means that the AddItemToVehicle operation is bound to the item that is specified in the URI of the request message. The request message may be represented as follows:

POST serviceroot/People('BG09B')/AddToVehicle

The AddToVehicle operation is bound to the entity name of "People" and to the entity identifier (e.g., GUID), which may uniquely identify the people entity "russelwhyte." The message pair data for the AddToVehicle operation may include a parameter binding information tag for both the EntityId and EntityName parameters to indicate that the operation is bound to those parameters. The parameter information for the Vehicle parameter does not include a binding information tag indicating that the operation is not bound to it and the parameter value is to be extracted from the payload.

In some embodiments, when the endpoint system receives a message, the endpoint system extracts the operation name from the message. For example, the endpoint system extracts "AddItemToVehicle." The endpoint system then retrieves the message pair data for the AddItemToVehicle operation. The endpoint system retrieves the value for each parameter as specified by the field tags of the message pair data. When the parameter information for the parameter includes parameter binding information, the endpoint system retrieves a value for the parameter from the URI. For example, since the parameter information for the EntityId and EntityName parameter includes the parameter binding information tag, the endpoint system extracts "People" as the value for the EntityName parameter and "BG09B" as the value for the EntityId parameter. When the parameter information for the parameter does not include parameter binding information, the endpoint system retrieves a value for the parameter from the payload For example, since the parameter information for the Vehicle parameter does not include a parameter binding tag, the endpoint system extracts the vehicle identifier from the payload, which may be specified using a JSON format. The endpoint system then invokes the operation passing the extracted parameters.

In some embodiments, the endpoint system allows the message pair data to specify the entity types to which the operation can be bound. For example, the AddItemToVehicle operation can be bound to an entity that is of a people, an animal, or a product entity type. To indicate that the entity types, the message pair data includes a message binding tag (e.g., "msgbindinfo>") that list the entity types to which the operation can be bound. When a request message is received, the endpoint system ensures that the entity type specified in the URI matches one of the entity types specified by the message binging information tag. If it does not, the endpoints system sends a response message that indicates an error.

In some embodiments, the endpoint system supports accessing of metadata of underlying data model. The accessing includes creating, reading, updating, and deleting of the metadata, which is referred as "CRUD" operations. For example, the name of the operation to create a new entity type may be "CreateEntity," and the name of the operation to retrieve the data of metadata entity may be "GetEntity." Rather than specifying the operation name in the request message, the endpoint system uses the HTTP verbs to represent the request operation. For example, a request message to create an entity may specify the POST verb and the URI may specify the metadata type to be created such as Entity or Attribute. The request message may be represented as follows:

POST api/data/Entity

The payload for the request message specifies the attributes (e.g., an address field and a name) for the newly entity type. The message pair data for the CRUD operation on metadata includes message binding information indicates that the operation is on metadata, the metadata type, and the specific HTTP verb. For example, the message binding information for the create entity operation may have a flag indicating that the operation is on metadata and indications of Entity and POST. An update metadata operation may also be specified using the POST verb. In such a case, the endpoint system may distinguish a create metadata request from an update metadata request by the absence or presences of the key for a specific metadata entity in the URI. The endpoint system may use the GET verb to represent a retrieve request and the DELETE to represent a delete request.

In some embodiment, each entity type may derive from a base entity type (e.g., m CrmbaseEntity), which is abstract. As described below, the deriving from the base entity type allows all instances of entities to be identifies by a reference to their base entity.

As another example, a request message to add an item to a campaign may be represented as follows:

```
api/data/list(4d59)/AddItemCampaign
{
'Campaign':{ 'campaignid':'2349'}
}
```

The "api" identifies the REST endpoint, "list" identifies that the item to be added as the entity type of list, the "4d59" is the identifier of a list entity, and "AddItemCampaign" is the name of the operation. The payload of the message, which is in the JSON format, specifies that the identifier "2349" of the campaign entity to which the list entity is to be added.

To support the processing of messages for a REST endpoint, the endpoint system generates new message pair data for each existing message pair (e.g., SOAP message pairs) that is to be used for the REST endpoint. Each new message pair data includes an <endpoint> tag to indicate that the new message pair data is for the REST endpoint as follows:

<Endpoint>api</Endpoint>.

The new message pair data may also include a <MsgBindInfo> tag and a <ParamBindInfo> tag. The <MsgBindInfo> tag specifies the possible entity types of the parameter to which the operation may be bound. For example, if the AddItemCampaign operation can be used to add a list entity, a campaign entity, or a product entity, then the tag may be represented as follows:

<MsgBindInfo>list, campaign, product</MsgBindInfo>.

When a request that specifies the AddItemCampaign operation is sent to the REST endpoint, the endpoint system ensures that the entity type specified in the URI is a list, a campaign, or a product based on the <MsgBindInfo> tag in the message pair data for the AddItemCampaign operation.

The <ParamBindInfo> tag specifies the parameters of the URI to which the operation is bound. For example, the EntityId parameter and the EntityName parameter of the URI are bound to the AddItemCampaign operation. A<ParamBindInfo> tag may be added to the <Field> tag for each of these parameters to indicate that value of the parameter is in the URI and the parameter bound to the operation as follows:

<ParamBindInfo>Bound:TRUE</ParamBindInfo>.

The message pair data for the AddItemCampaign operation may be represented as follows:

```
<MessagePair>
    <Endpoint>OData</Endpoint>
    <MsgBindInfo>list,campaign,product</MsgBindInfo>
    <MessageRequest>
        <Name>AddItemCampaign</Name>
        <Fields>
            <Field>
                <Name>CampaignId</Name>
                <ClrParser>System.Guid</ClrParser>
            </Field>
            <Field>
                <Name>EntityId</Name>
                <ClrParser>System.Guid</ClrParser>
                <ParamrBindInfo>Bound:TRUE</ParamBindInfo>
            </Field>
            <Field>
                <Name>EntityName</Name>
                <ClrParser>System.String</ClrParser>
                <ParamBindInfo>Bound:TRUE</ParamBindInfo>
            </Field>
        </Fields>
    </MessageRequest>
    <MessageResponse>
    . . .
</MessagePair>
```

As discussed above, in some embodiments, the endpoint system represents CRUD operations on the metadata of the data model (e.g., create a metadata entity for an entity type or an attribute) using the HTTP verbs, rather than representing the operation ("CreateEntity") in the URI itself. These operations on the metadata are referred to as primitive operations. For example, the request to create a new entity type of "Bank" may be represented as follows:

```
POST api/data/Entity
{
    "EntityName":"Bank"
    ...
}
```

The "POST" indicates create and "Entity" indicates that a new entity type is to be created. The new message pair data for the create entity operation includes a <MsgBindInfo> tag that specifies that the operation is specified by a primitive operation, the primitive operation, and the entity type. For example, the <MsgBindInfo> tag for the message pair data for the create entity operation may be represented as follows:

```
<MsgBindInfo>
    Primitive:TRUE,MetadataName:Entity,PrimitiveOperationMethod:POST
</MsgBindInfo>.
```

The "PrimitiveOperationMethod:POST" indicates that the service is bound to the primitive method of POST.

The syntax for the various forms of the <MsgBindInfo> tag may be represented as one of the following forms:
1. Primitive:True,
   MetadataName:<MetadataEntityName>,
   PrimitiveOperationMethod:<HttpMethod>|
2. Entity:Bound/<OTCs>|
3 Entity Set:Bound/<OTCs>.

The first form is for messages that primitive operations. "Primitive:True" means this operation is a primitive operation on a metadata entity. The "<MetadataName>" can be
   Entity|Attribute|EntityKey|CrmbaseEntity
where all the entities derive from CrmbaseEntity. The "<HttpMethod>" can be
   POST|PUT|PATCH|GET|DELETE.

The second form is for messages that perform operations on an entity such as a list entity or a campaign entity. The second form represents the entity types to which operation of the message can be bound. "Entity:Bound" represents that the operation is bound to a primary entity type specified for the operation. "Entity:<OTCs>" represents that the operation can be bound to any of the enumerated entity types, which may be represented by object type codes ("OTCs").

The third form is similar to the second form except that the operation is bound to an entity set, rather than a single entity.

The syntax for the various options of the <ParamBindInfo> tag may be represented as follows:
   Bound:TRUE|OTC:OTC|AsEntityParameter:<ParameterName>

The first option "BOUND:TRUE" is to indicate that the operation is bound to the parameter with value taken from the URI. The parameters from the resource identifier of the URI to which an operation can be bound include a reference to an entity (e.g., EntityReference), a reference to an array of entities, a GUID, an array of GUIDs, a string, and a reference to a collection of entity references (e.g., "EntityReferenceCollection"). The parameters from the query option to which an operation can be bound include a query base (e.g., "QueryBase"), a query expression (e.g., "QueryExpression") and a set of columns (e.g., "ColumnSet"). If the <MsgBindInfo> tag indicates that the operation is bound to a single entity (e.g., "Entity:Bound"), then exactly one <Field> tag of the message pair data can include <ParamBindInfo> tag. Also, at most one <Field> tag of the message pair for a query parameter can include the <ParamBindInfo> tag.

OData does not support complex types needed to support query expressions ("QueryExpression") and query base ("QueryBase") parameters. The endpoint system allows a parameter that is a query to be bound to the query options of a URI. For example, a URI to retrieve accounts may be represented as follows:

api/data/accounts?$filter=name eq 'somevalue'&$select=name.

The column set ("ColumnSet") for a query is exposed as the "$select" of the query option.

The binding system allows query parameters for the OData endpoint only for composable functions. A composable function has the following characteristics:
1. The message is read-only.
2. The message has only one return type parameter (Collection<CrmbaseEntity>) for QueryExpression and Collection<CrmbaseEntity> or CrmbaseEntity for ColumnSet.
3. The message has only one input parameter of QueryExpression, QueryBase or ColumnSet A request message may be represented as follows:

```
OData/data/RetrieveByGroupResource(ResourceId)?
$filter=name eq 'somevalue'&$select=name
```

The corresponding message pair data may be represented as follows:

```
<MessagePair>
    <Endpoint>OData</Endpoint>
    <MsgBindInfo>list,campaign,product</MsgBindInfo>
    <MessageRequest>
        <Name>RetrieveByGroupResource</Name>
        <Fields>
            <Field>
                <Name>ResourceGroupId</Name>
                <ClrParser>System.Guid</ClrParser>
            </Field>
            <Field>
                <Name>Query</Name>
                <ClrParser>QueryBase</ClrParser>
                <ParamBindInfo>Bound:TRUE</ParamBindInfo>
            </Field>
            <
        </Fields>
    </MessageRequest>
    <MessageResponse>
    ...
</MessagePair>
```

The second option is for a parameter that is strongly typed. The types of parameters to which an operation can be bound ar a reference to an entity (e.g., EntityReference), a reference to an array of entities, a GUID, an array of GUIDs, and a reference to a collection of entity references (e.g., "EntityReferenceCollection"). For example, "OTC:4400" indicates that parameter is a reference to a list entity assuming 4400 is the object type code for the list entity.

The third options supports the combining an entity identifier (Guid) parameter and an entity name (string) parameter so that they can be exposed as one OData parameter. The AsEntityParameter indicates to which parameter of the URI the message parameter is bound to. For example, if the operations has the follow signature
Guid AddItemCampaignActivity(Guid CampaignActivityId, Guid ItemId, string EntityName)
The binding system exposes the operation as
Guid AddItemCampaignActivity(CampaignActivity CampaignActivity, CrmBaseEntity Item)

In some embodiments, the endpoint system may generate a service document and metadata document as specified by the OData protocol. The service document lists the entity sets, functions, and singletons that can be retrieved, and the metadata document describes the types, sets, functions, and actions understood by the REST endpoint. The service document and the metadata document can be generated from the message pair data and the metadata of the endpoint system. The endpoint system can advertise the service document and the metadata document to clients.

```
<MessagePair>
    <Endpoint>OData</Endpoint>
    <MessageRequest>
        <Name> AddItemCampaignActivity_</Name>
        <Fields>
            <Field>
                <Name>CampaignActivityId</Name>
                <ClrParser>System.Guid</ClrParser>
                <ParamBindInfo>
                    OTC:4402,AsEntityParameter:CampaignActivity
                </ParamBindInfo>
            </Field>
            <Field>
                <Name>ItemId</Name>
                <ClrParser> System.Guid </ClrParser>
                <ParamBindInfo> AsEntityParameter:Item </ParamBindInfo>
            </Field>
            <Field>
                <Name>EntityName</Name>
                <ClrParser>System.String</ClrParser>
                <ParamBindInfo>AsEntityParameter:Item</ParamBindInfo>
            </Field>
        </Fields>
    </MessageRequest>
    <MessageResponse>
    . . .
</MessagePair>
```

FIG. 1 is a block diagram illustrating aspects of an endpoint system in some embodiments. A endpoint system includes a data store 110, components 120, and operations 130. The data store stores the data of endpoint system in a message pair store 111, an entity model store 112, and a database 113. The message pair store includes an entry for each message pair that includes the message pair data for that message pair. In some embodiments, the endpoint system may preprocess the message pair data that is in the XML format and store the message pair data in a form for more efficient processing at runtime. The entity data model stores the metadata of the database includes the definition of the entity types and attributes. The database includes entity type tables 113A-113N that store the data of the application that the endpoint system makes available to the clients. The components include a create message pair component 121, a message handler component 122, a process metadata message component 123, and a process data message component 124. The create message pair component facilitates the creating of new message pair data for a message for the REST endpoint based on existing message pair data for the message. The message handler component receives messages from client, parses the messages, and invokes the process metadata component to handle messages that access the metadata and the process data component to handle messages that access the database. The operations include operations 130A-N that each implements that functionality of a message. The operations may be predefined by the application or may be defined by users as customization to the application.

The computing systems on which the endpoint system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have data recorded on them or may be encoded with computer-executable instructions or logic that implements the endpoint system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting deployment data using the keys.

The endpoint system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the endpoint system may be implemented in hardware using, for example, an application-specific integrated circuit (ASIC).

In some embodiment, the endpoint system may preprocess the message pair data and generate a mapping to facilitate retrieval of the message pair data given a request message. The endpoint system may also generate a message-specific function for each message that implements the extracting of the parameters and invoking of the operation as specified by the message pair data. For example, the endpoint system may generate a function includes code to extract the values from the URI for parameters with parameter binding information and values from the payload for the other parameters as specified by the message pair data. The function also includes a code that invokes the operation passing the extracted values as actual parameters.

Figure 2:
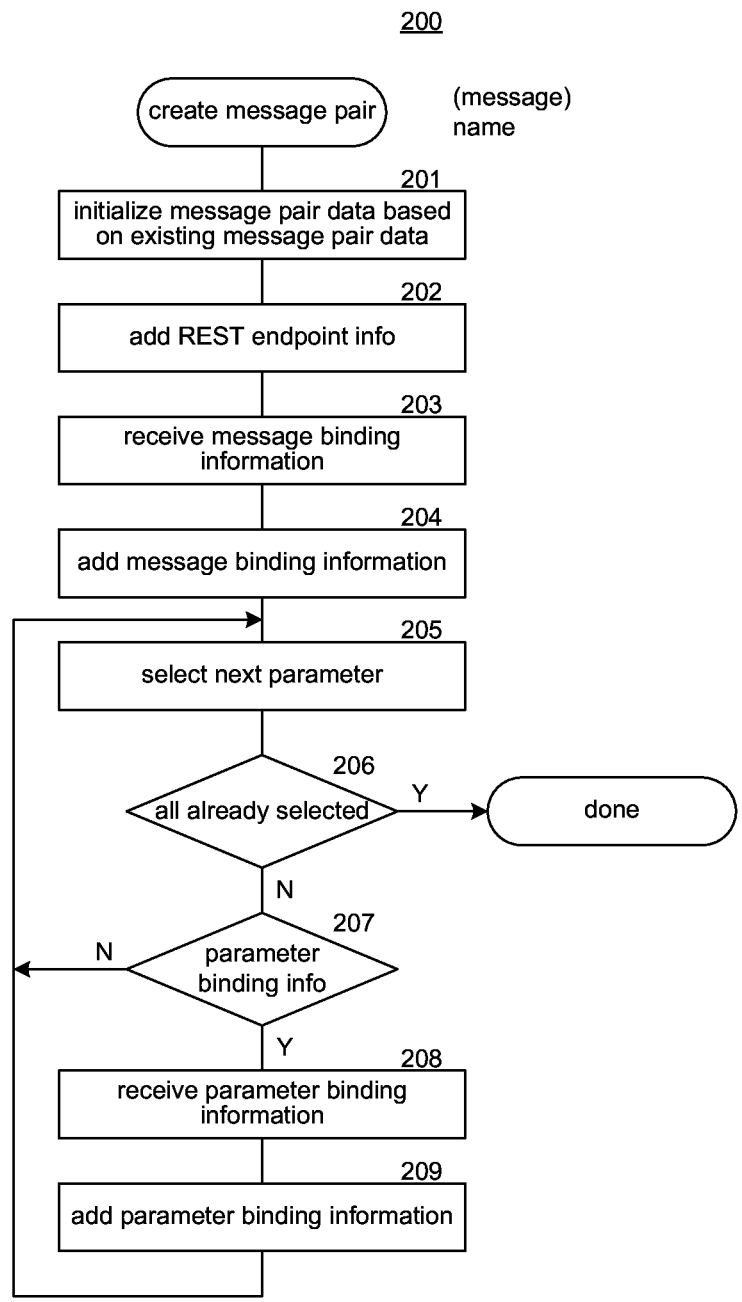
FIG. 2 is a flow diagram that illustrates processing of a create message pair component in some embodiment.

FIG. 2 is a flow diagram that illustrates processing of a create message pair component in some embodiment. A create message pair component 200 facilitates the creating of new message pair data for a REST endpoint based on existing message pair data for a SOAP endpoint. The component is passed name of the message for which the new message pair data is to be created. In block 201, the component initializes the new message pair data for the message, for example, by copying the existing message pair data for the message to the new message pair data. In block 202, the component adds an endpoint tag or modifies an existing endpoint tag to indicate that the new message pair data is for the REST endpoint. In block 203, the component receives message binding information, if any, for the new message pair data. In block 204, if message binding information was received, the component adds a message binding information tag to the new message pair data. In blocks 205-209, the component loops adding parameter binding information for the parameters of the new message pair data. In block 205, the component selects the next parameter of the operation as indicated by a field tag in the new message pair data. In decision block 206, if all the parameters have already been selected, then the component completes, else the component continues at block 207. In block 207, if parameter binding information is to be provided for the selected parameter, then the component continues at block 208, else the component loops to block 205 to select the next parameter. In block 208, the component receives the parameter binding information for the selected parameter. In block 209, the component adds a parameter binding information tag to the field tag for the selected parameter and then loops to block 205 to select the next parameter.

Figure 3:
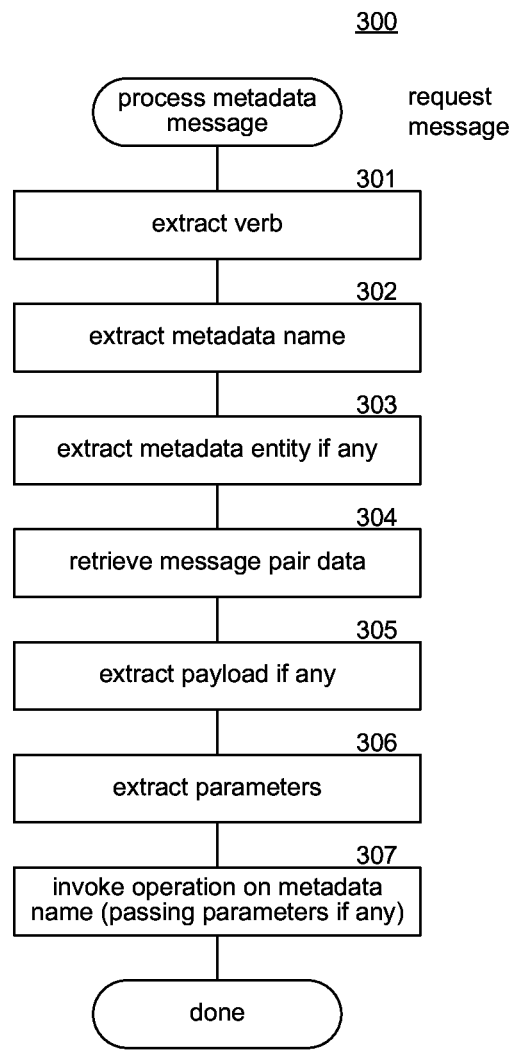
FIG. 3 is a flow diagram that illustrates processing of a process metadata message component in some embodiments.

FIG. 3 is a flow diagram that illustrates processing of a process metadata message component in some embodiments. A process metadata message component 300 is passed a request message that is for access metadata. In block 301, the component extracts the verb (e.g. GET) from the request message. In block 302, the component extracts the metadata name (e.g., Entity). In block 303, the component extract an entity identifier (e.g., GUID), if any, from the request message. In block 304, the component retrieves the message pair data for the message corresponding to the extracted verb, entity name, and entity identifier. In block 305, the component extracts the payload if any. In block 306, the component extracts the value the parameters from the URI of the request message and from the payload as specified by the field tags of the message pair data. In block 307, the component invokes the operation specified by the message name of the message pair data passing the extracted parameters. Although not illustrated, the component also prepares a response message. The component then completes.

Figure 4:
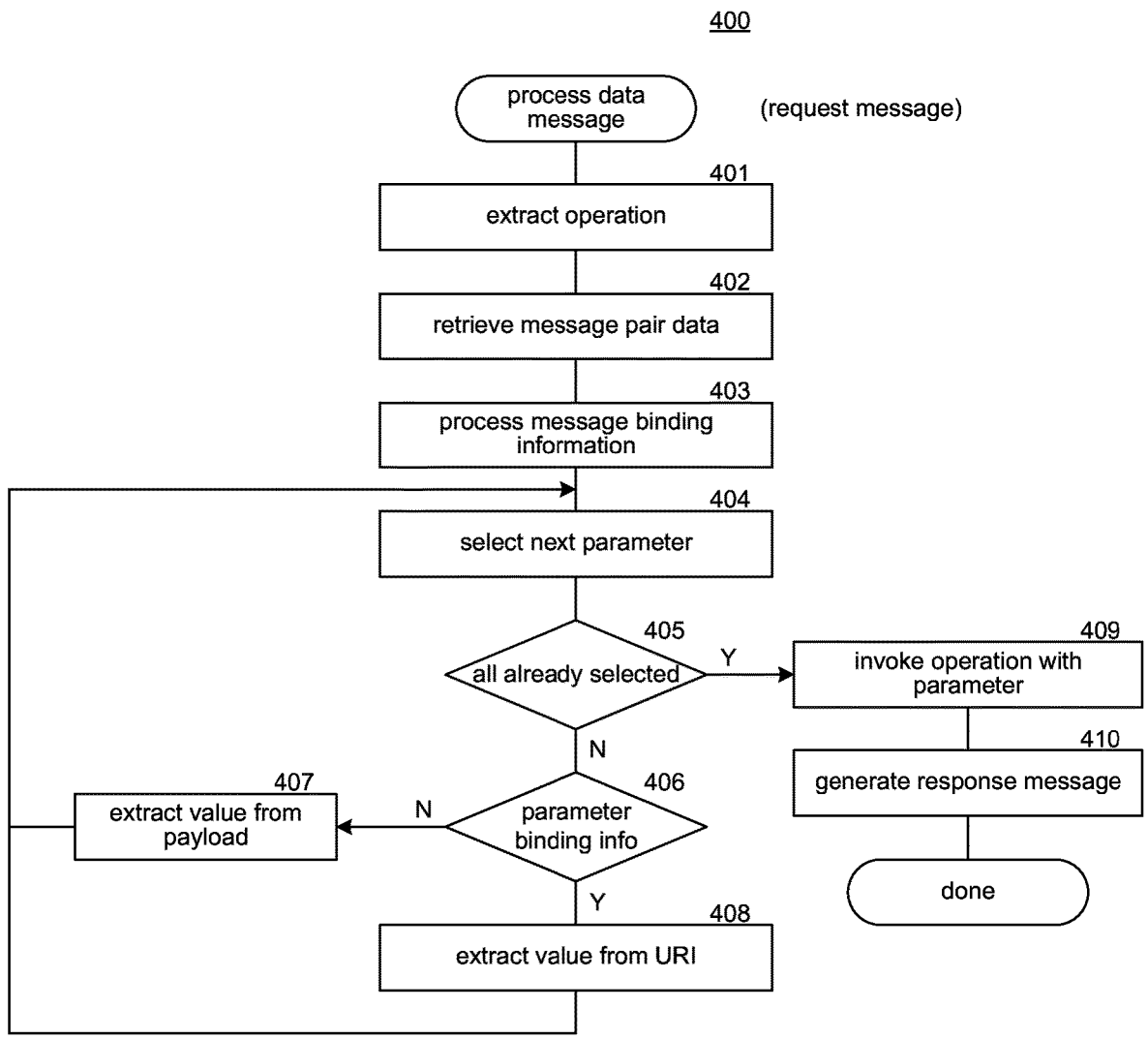
FIG. 4 is a flow diagram that illustrates the processing of a process data message component in some embodiment.

FIG. 4 is a flow diagram that illustrates the processing of a process data message component in some embodiment. A process data message component 400 is invoked to process a request message that accesses data of the database. In block 401, the component extracts the operation from the request message. In block 402, the component retrieves that message pair data for the operation for the REST endpoint. In block 403, the component extracts the message binding information if any from the message pair data. In blocks 404-408, the component loops extracting the value for each parameter. In block 404, the component selects the next parameter. In decision block 405, if all the parameters have already been selected, then the component continues at block 409, else the component continues at block 406. In decision block 406, if the field tag for the parameter includes a parameter binding information tag, then the component continues at block 408, else the component continues at block 407. In block 407, the component extracts the value for the parameter from the payload of the message and loops to block 404 to select the next parameter. In block 408, the component extracts the value from the URI and loops to block 404 to select the next parameter. The component also ensures that the values extracted from the URI are consistent with the message binding information and if not, sends a response message indicating an error. In block 409, the component invokes the operation of the message pair data passing the extracted values as actual parameters. In block 410, the component generates a response message and completes.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A computer-implemented method, comprising:
identifying an operation that is specified by a Uniform Resource Identifier (URI) in a Representational State Transfer (REST) message;
based on the operation, accessing message pair data that comprises first parameter information;
determining that the first parameter information comprises first parameter binding information that indicates a first parameter is bound to the URI in the REST message;
based on the first parameter binding information, extracting a first parameter value from the URI; and
passing the first parameter value to a component that is configured to perform the operation.

2. The method of claim 1, wherein the message pair data further comprises second parameter information, and further comprising:
determining that the second parameter information does not include any parameter binding information; and
extracting a second parameter value from a payload of the REST message.

3. The method of claim 1, wherein the message pair data further comprises:
 message binding information indicating that the operation is performed on metadata; and
 a Hypertext Transfer Protocol (HTTP) verb that matches the operation.

4. The method of claim 3, wherein the HTTP verb is POST, wherein the URI does not identify any metadata entities, and further comprising:
 creating a metadata entity; and
 determining an attribute of the metadata entity from the REST message.

5. The method of claim 3, wherein the HTTP verb is PATCH, wherein the URI identifies a metadata entity, and further comprising updating the metadata entity based on an attribute identified from the REST message.

6. The method of claim 3, wherein the HTTP verb is GET, and further comprising retrieving an attribute for a metadata entity identified in the REST message.

7. The method of claim 3, wherein the HTTP verb is DELETE, and further comprising deleting a metadata entity identified in the REST message.

8. The method of claim 1, wherein the message pair data further comprises message binding information indicating an entity type, and further comprising binding the operation to the entity type.

9. The method of claim 1, wherein the first parameter binding information indicates that the first parameter is bound to a query option of the URI, and further comprising retrieving a query parameter value from the query option.

10. The method of claim 1, wherein the message pair data is in an eXtensible Markup Language (XML), and wherein the first parameter binding information comprises an XML tag.

11. A computing system, comprising:
 one or more processors;
 memory in electronic communication with the one or more processors; and
 message pair data stored in the memory, the message pair data comprising first parameter information;
 instructions stored in the memory, the instructions being executable by the one or more processors to:
  identify an operation that is specified by a Uniform Resource Identifier (URI) in a Representational State Transfer (REST) message;
  based on the operation, access the message pair data;
  determine that the first parameter information comprises first parameter binding information that indicates a first parameter is bound to the URI in the REST message;
  based on the first parameter binding information, extract a first parameter value from the URI; and
  pass the first parameter value to a component that is configured to perform the operation.

12. The computing system of claim 11, wherein the message pair data further comprises second parameter information, and wherein the instructions are additionally executable by the one or more processors to:
 determine that the second parameter information does not include any parameter binding information; and
 extract a second parameter value from a payload of the REST message.

13. The computing system of claim 11, wherein the message pair data further comprises:
 message binding information indicating that the operation is performed on metadata; and
 a Hypertext Transfer Protocol (HTTP) verb that matches the operation.

14. The computing system of claim 11, wherein the message pair data is in an eXtensible Markup Language (XML), and wherein the first parameter binding information comprises an XML tag.

15. A computer-implemented method, comprising:
 determining that message pair data from a Representational State Transfer (REST) endpoint comprises first parameter information;
 generating augmented message pair data; and
 storing first augmented parameter information in the augmented message pair data, the first augmented parameter information comprising the first parameter information and first parameter binding information, the first parameter binding information indicating that a first parameter is bound to a parameter value of a Uniform Resource Identifier (URI) in a REST message.

16. The method of claim 15, further comprising:
 determining that the message pair data from the REST endpoint further comprises second parameter information; and
 storing the second parameter information in the augmented message pair data without storing any parameter binding information with the second parameter information.

17. The method of claim 15, wherein the message pair data and the augmented message pair data are in an eXtensible Markup Language (XML), and wherein the first parameter binding information comprises an XML tag.

18. The method of claim 15, further comprising:
 storing in the augmented message pair data an indication of an operation; and
 storing a Hypertext Transfer Protocol (HTTP) verb that matches the operation.

19. The method of claim 15, further comprising storing an indication that the augmented message pair data supports the REST endpoint.

20. The method of claim 15, further comprising storing in the augmented message pair data an indication of an operation, wherein the first parameter binding information indicates that the operation is bound to a query parameter that is a value in a query option portion of the URI.

* * * * *